Figure 1:
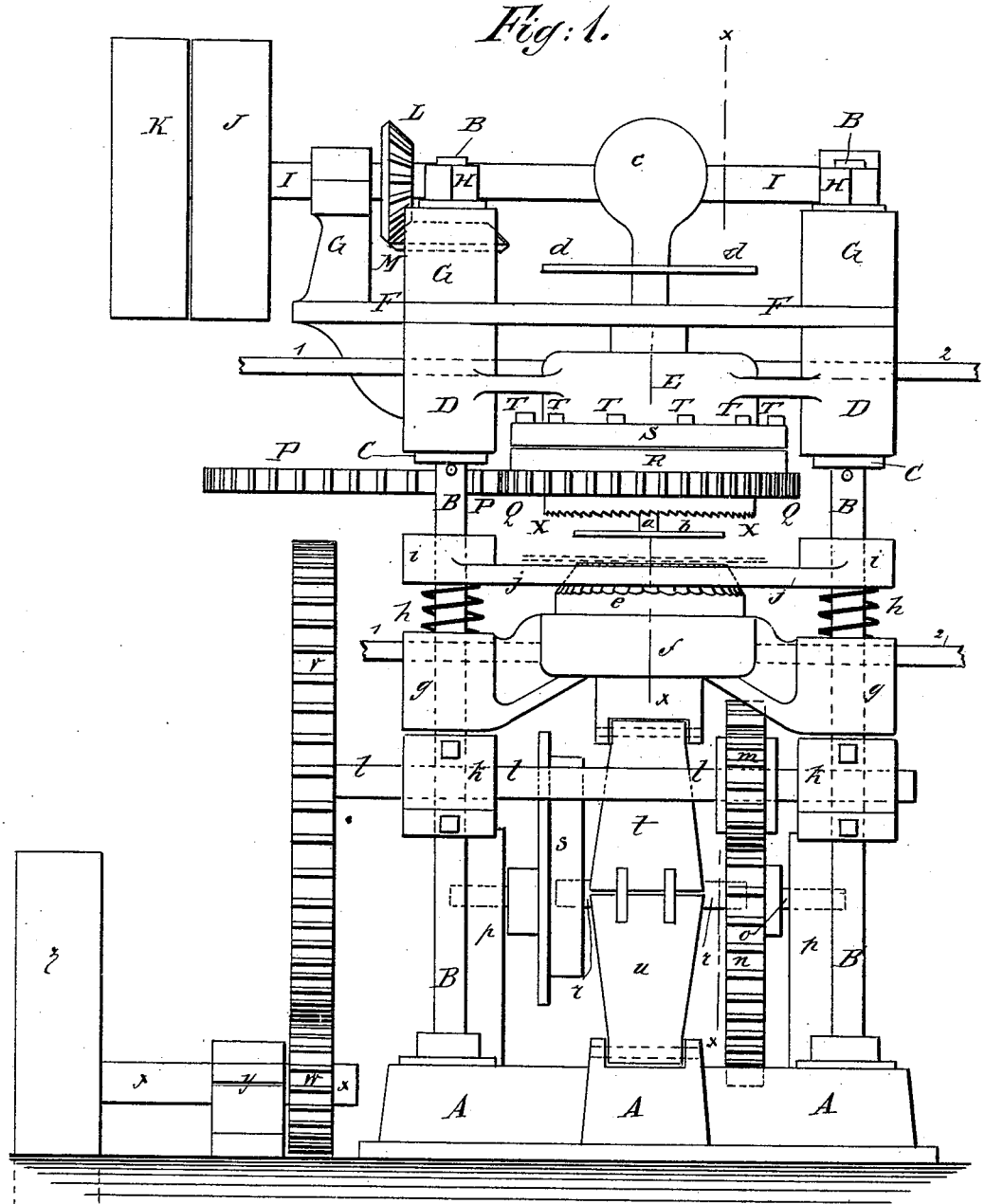

(No Model.) 3 Sheets—Sheet 1.

C. H. TREAT & A. B. BANGHART.
MACHINE FOR MAKING VENEER DISHES.

No. 360,181. Patented Mar. 29, 1887.

WITNESSES:
Chas. Nida
C. Sedgwick

INVENTOR:
C. H. Treat
A. B. Banghart
BY Munn & Co.
ATTORNEYS.

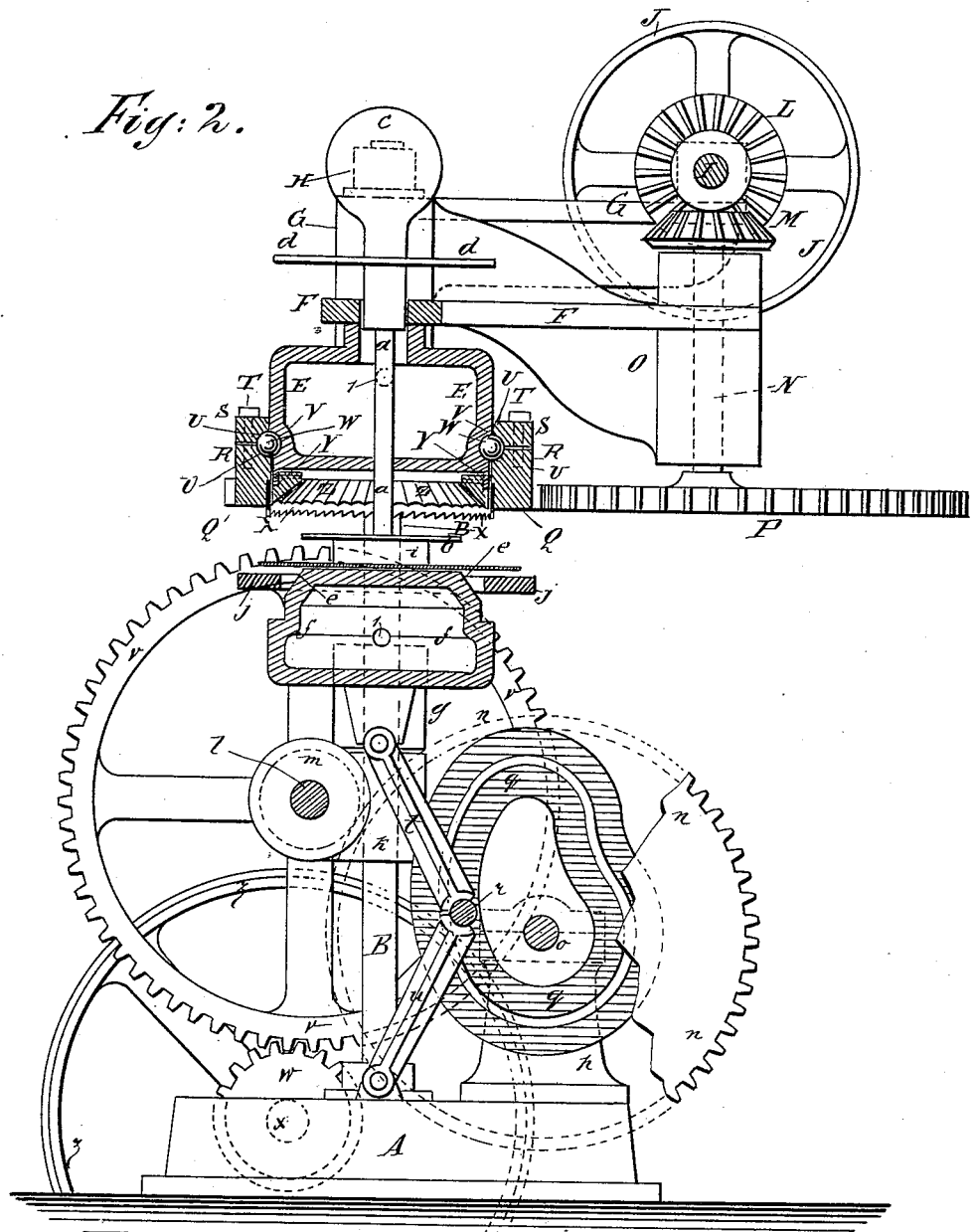

(No Model.) 3 Sheets—Sheet 3.
C. H. TREAT & A. B. BANGHART.
MACHINE FOR MAKING VENEER DISHES.
No. 360,181. Patented Mar. 29, 1887.
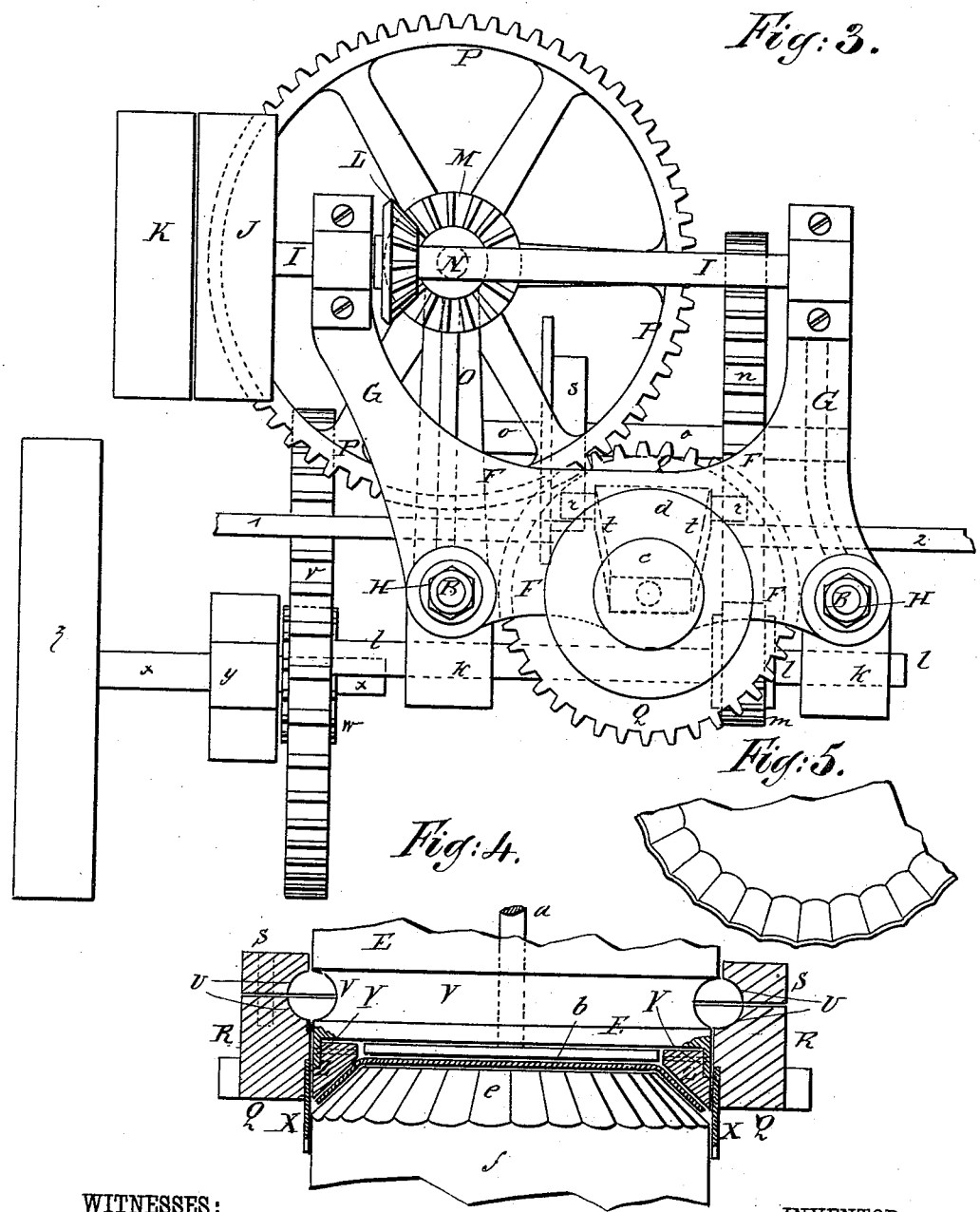
WITNESSES:
Chas. Nieia
C. Sedgwick
INVENTOR:
C. H. Treat
A. B. Banghart
BY Munn & Co.
ATTORNEYS.

UNITED STATES PATENT OFFICE.

CHARLES H. TREAT AND ANDREW B. BANGHART, OF GEORGETOWN, DEL.

MACHINE FOR MAKING VENEER DISHES.

SPECIFICATION forming part of Letters Patent No. 360,181, dated March 29, 1887.

Application filed April 6, 1886. Serial No. 198,027. (No model.)

*To all whom it may concern:*

Be it known that we, CHARLES H. TREAT and ANDREW B. BANGHART, both of Georgetown, in the county of Sussex and State of Delaware, have invented a new and useful Improvement in Machines for Making Veneer Dishes, of which the following is a full, clear, and exact description.

Reference is to be had to the accompanying drawings, forming a part of this specification, in which similar letters of reference indicate corresponding parts in all the figures.

Figure 1 is a front elevation of our improved machine, parts being broken away. Fig. 2 is a sectional side elevation of the same, taken through the line $x\ x$, Fig. 1. Fig. 3 is a plan view of the same. Fig. 4 is a sectional side elevation of the saw and upper die and their holder and of a pressed dish, and showing the lower part of the upper steam-cylinder and the lower die, and part of the lower steam-cylinder in side elevation. Fig. 5 is a face view of a part of a finished dish.

The object of this invention is to provide machines for making veneer dishes, which shall be so constructed as to saw out the veneer disks and form the dishes in a continuous operation.

The invention consists in the construction and combination of various parts of the machine, as will be hereinafter fully described, and specifically pointed out in the claim.

A represents the bed-plate of the machine, to the side parts of which are attached the lower ends of two standards, B. To the standards B, at a little distance from their upper ends, are secured, by pins, set-screws, or other suitable means, two collars, C, upon which rest lugs D, formed upon the opposite sides of the steam-chest E, so as to support the said steam-chest in place firmly and adjustably.

The standards B pass through holes in the plate F, which rests upon the lugs D and holds the upper parts of the said standards B in proper relative position. The upper parts of the standards B pass through brackets G, and have nuts H screwed upon their upper ends, securing the brackets G, the plate F, and the lugs D firmly in place.

I is a horizontal shaft, which revolves in bearings in the brackets G, and to one of its ends is attached a fast pulley, J, and a loose pulley, K, to receive a driving-belt. To the shaft I is attached a beveled gear-wheel, L, the teeth of which mesh into the teeth of the beveled gear-wheel M, attached to a short vertical shaft, N, which revolves in a bearing in a bracket, O, formed upon the brace-plate F or bracket G. To the lower end of the vertical shaft N is attached a large gear-wheel, P, the teeth of which mesh into the teeth of the annular gear-wheel Q. The gear-wheel Q is made with an upwardly-projecting annular flange, R, of such a size as to overlap the lower end of the steam-chest E, and to its top is secured an annular cap-plate, S, by screw-bolts T.

In the inner surface of the flange R and cap-plate S at their line of contact is formed a half-round annular groove, U, corresponding with a half-round annular groove, V, formed in the outer surface of the lower part of the steam-chest E. The grooves U V form an annular channel to receive a series of balls, W, to support the gear-wheel Q and its attachments, and to lessen the friction as the said gear-wheel and its attachments are rotated.

To the inner surface of the gear-wheel Q is secured a tubular saw, X, to cut the veneer sheets into disks. Upon the outer edge of the bottom of the steam-chest E is formed an annular flange, Y, to which is secured the base of the upper die, Z, by pins passing through the said flange and into the said die. The die Z is made of annular form and with its inner surface inclined and scalloped, as shown in Fig. 2, the upper part of the saw X being thus between the die Z and the gear-wheel Q.

The upper steam-chest, E, is perforated centrally and vertically for the passage of the stem $a$, to the lower end of which is attached a circular plate, $b$, to hold the veneer in place upon the lower die, hereinafter described, while being sawed and pressed into shape. The plate $b$ is made of such a size as to fit into the interior of the base of the die Z, and of a thickness equal to the thickness of the inner edge of the said base, so as to serve as a bottom for the said die while pressing the dishes.

The stem $a$ passes steam-tight through the steam-chest E, and to the upper end of the said stem is attached a weight, $c$, which is designed to be of sufficient gravity to hold the veneer in place upon the lower die. To the stem *a* is also attached a plate, *d*, to serve as an additional weight, and also as a shelf to receive other weights when required. *e* is the lower die, which is formed upon or attached to the top of the lower steam-chest, *f*. Upon the opposite sides of the steam-chest *f* are formed perforated lugs *g*, to receive and slide upon the standards B.

Upon the standards B, above the lugs *g*, are placed spiral springs *h*, the upper ends of which rest against perforated lugs *i*, formed upon the ends of the plate *j*. The plate *j* is provided with a central opening for the lower die, *e*, to pass through, and serves as a feed-table for convenience in adjusting the veneers upon the said lower die. The plate *j* is designed to receive the square veneers and move up level with lower die, *e*, until the said plate strikes the collars C, when the springs *h* mash down as the lower die, *e*, forms the dishes. The plate *j* assists in holding the veneer while the sawing is being done, and also receives the waste veneer and the sawdust.

To the standards B are attached bearings *k*, in which revolves the horizontal shaft *l*. To the shaft *l* is attached a pinion-wheel, *m*, the teeth of which mesh into the teeth of the large gear-wheel *n*, attached to the shaft *o*. The shaft *o* revolves in bearings in standards *p*, attached to the bed-plate A. To one side of the gear-wheel *n* is attached or upon it is formed a cam-groove, *q*, in which travels one end of the pin *r*. The other end of the pin *r* travels around a cam, *s*, attached to the shaft *o*, so that both ends of the said pin *r* will be firmly supported. To the pin *r* are hinged the adjacent ends of the toggle-bars *t u*. The upper end of the upper bar, *t*, is hinged to the bottom of the steam-chest *f*, and the lower end of the lower bar, *u*, is hinged to the bed-plate A, so that the steam-chest *f* and the lower die, *e*, will move up and down as the toggle bars *t u* are operated by the cams *q s*. To one end of the shaft *l* is attached a large gear-wheel, *v*, the teeth of which mesh into the teeth of the pinion-wheel *w*, attached to the shaft *x*. The shaft *x* revolves in bearings *y*, attached to the floor or some other suitable support, and to the said shaft is attached a pulley, *z*, to receive the driving-belt. The steam-chests E *f* are provided with steam-inlet pipes 1 and steam-discharge pipes 2 in the ordinary manner.

When the machine is at work, the lower driving mechanism is stopped when the dishes are formed and started when the dishes are baked, and the upper driving mechanism is only run while the saw is to be operated. In using the machine, the sheets of veneer are laid upon the plate *j*, and are carried up with the said plate and the die *e* into contact with the plate *b*, and carry the said plate and its weights with them as they continue their upward movement. As the veneers approach the saw X, the saw-driving mechanism is started, so that the said saw will cut the veneers into circular disks, which disks, as the lower die continues its upward movement, are forced into the upper die and pressed into form. When the lower die has reached the limit of its downward movement, it remains stationary while the pin *r* is passing around the circular parts of the cams, to allow time for the operator to remove the pressed dishes and arrange other sheets of veneer to be operated upon.

Having thus fully described our invention, what we claim as new, and desire to secure by Letters Patent, is—

In a machine for making veneer dishes, the combination, with the upper steam-chest, E, having annular groove V, the stationary upper die, Z, the movable lower die, *e*, and the holding-disk *b* and its weighted stem *a*, of the tubular saw X, the annular gear-wheel Q, having flange R, and the ring S, the said flange and ring being provided with an interior groove, U, the anti-friction balls W, and a driving mechanism, substantially as herein shown and described, whereby the said saw can rotate freely and will be securely connected with the said steam-chest, as set forth.

CHAS. H. TREAT.
ANDREW B. BANGHART.

Witnesses:
EDMOND GRIEVE,
LEWIS W. HEINZER.